May 25, 1954     T. VAN METER     2,679,235
MOTOR DISTRIBUTING VALVE WITH A LOAD FEEL AREA
Filed June 28, 1952
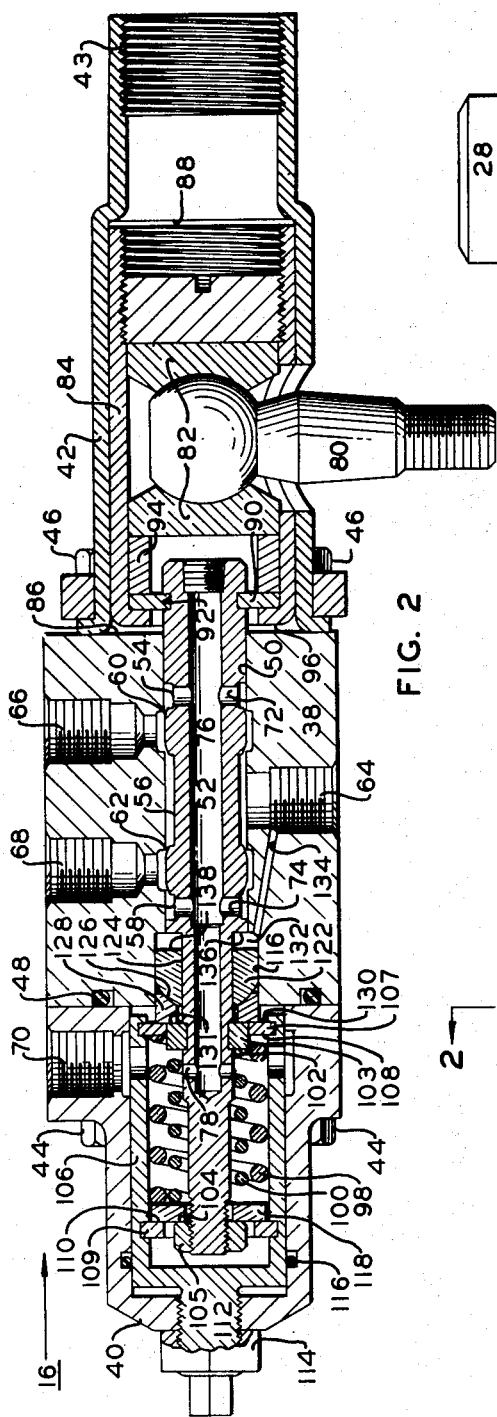
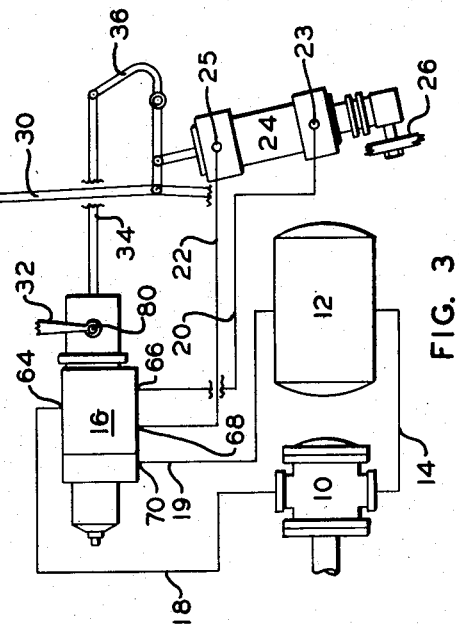
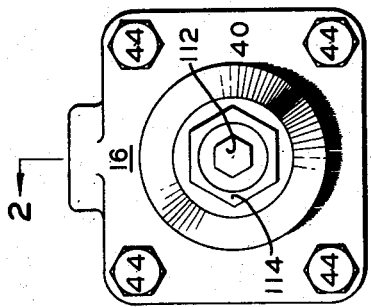
*INVENTOR.*
THEODORE VAN METER
BY
ATTORNEY Patented May 25, 1954

2,679,235

UNITED STATES PATENT OFFICE 2,679,235

MOTOR DISTRIBUTING VALVE WITH A LOAD FEEL AREA

Theodore Van Meter, Oak Park, Mich., assignor to Vickers Incorporated, Detroit, Mich., a corporation of Michigan Application June 28, 1952, Serial No. 296,118

5 Claims. (Cl. 121—46.5)

This invention relates to power transmissions, and is particularly applicable to those of the type comprising two or more fluid pressure energy translating devices, one of which may function as a pump and another as a fluid motor.

The invention more particularly relates to power transmissions adapted for use in servo application such as power steering the dirigible wheels of a vehicle.

Most designers of power steering systems for use in motor vehicles have endeavored to retain as nearly as possible the same handling characteristics as in the conventional manual system. This requires a follow-up type of system having "feel." By follow-up it is meant that the controlled member follows whatever movement is imparted to the controlling member, and "feel" means that the manual effort applied by the driver to the controlling member determines the force applied to the controlled member.

The type of control valve which has found the widest use in such systems has been the type having a neutral central position and being shiftable therefrom in opposite directions to effect opposite movement of a fluid motor connected to the vehicle dirigible wheels. Such valves are usually provided with spring-centering means to restore the valve to neutral position on removal of the shifting force. When "feel" is to be provided, one method is to add to the restoring force of the centering springs a hydraulically produced force also tending to restore, or center, the valve which is of a magnitude proportional to the force applied to the dirigible wheels. It is important in such valves that the centering means act to restore the valve to precisely the effective neutral position of the valve. Otherwise, improper steering will result. If the centered position of the valve is not made adjustable, machining tolerances must be very closely controlled, thus making the valve expensive to manufacture. Provisions made in the past for such adjustments have, however, been complex and difficult to manipulate requiring a number of operations.

It is an object of the present invention to provide an improved low cost control valve particularly well suited for use in a power steering system.

It is a further object to provide a spring-centered control valve, the center position of which is adjustable by a single simple adjustment, the making of which adjustment does not affect the centering force on said valve.

It is also an object of the present invention to provide in a control valve having a neutral central position a novel hydraulic centering device to apply a restoring force to the valve when shifted from that central position.

Another object is to provide a control valve having both spring and hydraulic centering devices conjointly adjustable.

Further objects and advantages of the present invention will be apparent from the following description, reference being had to the accompanying drawing wherein a preferred form of the present invention is clearly shown.

In the drawing:

Figure 1 is an end elevation of a control valve embodying a preferred form of the present invention.

Figure 2 is a section taken on line 2—2 of Figure 1.

Figure 3 is a schematic drawing illustrating the present invention utilized in a typical vehicle steering application.

Referring first to Figure 3 there is shown a pump 10 connected to a tank 12 by an inlet conduit 14 and to a control valve 16, embodying the present invention, by a delivery conduit 18. Control valve 16 is connected to the tank 12 by a return conduit 19. A pair of motor conduits 20 and 22 connect the control valve to opposing ends of a double-acting fluid motor 24 secured to the motor vehicle frame at 26. Motor 24 is connected to the tie rod 30 to exert hydraulically produced steering force on the vehicle dirigible wheel 28. Pitman arm 32 acts on valve 16 to apply mechanical steering force to the wheel 28 through the valve 16, drag link 34, bell crank 36, and tie rod 38, and to control the application of hydraulically produced steering force as hereinafter described.

Referring now to Figures 1 and 2 the construction of the control valve 16 is there illustrated. The valve comprises a body 38 having an end cap 40 and a sleeve 42 secured thereto by bolts 44 and nuts 46. Sleeve 42 is threaded at 43 to provide for connection of drag link 34. An O ring seal 48 insures a fluid tight juncture of the end cap 40 and the body 38. Body 38 has a stepped valve bore 50 therein which is provided with a slidable valve spool 52 having three cannelures 54, 56 and 58 thereon, thus forming a pair of lands 60 and 62. Body 38 is provided with a central pressure port 64 and a pair of motor ports 66 and 68. End cap 40 has a return port 70 therein.

In the central position of spool 52, as illustrated, an open-center condition exists, that is, pressure port 64 is in fluid communication with the return port 70 across lands 60 and 62, which have suitably tapered edges for that purpose, through radial passages 72 and 74, the central axial passage 76, and radial passages 78. It is also apparent that motor ports 66 and 68 both are connected to return port 70 when valve 52 is in the center position as shown. Movement of valve 52 will produce a pressure increase in one of the motor ports 66 or 68, in a manner well known in the art, thus producing hydraulic steering force at the motor 24.

Pitman arm 32 is provided with a ball stud 80 which is clamped between a pair of ball seats 82 carried by a sleeve 84. Sleeve 84 is axially slidable in sleeve 42, which is secured to the body 38 as aforesaid, to an extent determined by its endwise abutment with the body face 86 or the shoulder 88. Relative axial motion between spool 52 and sleeve 84 is prevented by a C washer 90 which engages a groove 92 in the spool 52, and is clamped between a spacer 94 and the inwardly flanged end 96 of sleeve 84.

Valve spool 52 is spring-centered in bore 50 by a nested pair of springs 98 and 100 which, though of different diameters, preferably have the same rate and assembled load so that resistance to movement by spool 52 is the same in either direction. Spool 52 has a pair of spaced apart abutments 102 and 104 thereon which are provided by, for example, a C washer 103 and a nut 105. A sleeve 106, carrying two snap rings 107 and 109 which provide a pair of abutments 108 and 110, is axially shiftable in end cap 40 by a threaded extension 112 provided with a locking nut 114. An O ring seal 116 prevents leakage from the cap 40. An axially floatable collar 118 encircles valve spool 52 between abutments 102 and 104, and is biased against abutment 110 by spring 98 acting against abutment 108. Spring 100 acts between collar 118 and abutment 102 to bias abutment 104 against the collar 118. Springs 98 and 100 thus bias spool 52 to a position fixed relative to sleeve 106 which sleeve, as aforesaid, is axially adjustable relative to the end cap 40 and hence body 38. The spring centered position of spool 52 is thus adjustable by a single operation which does not affect the centering forces.

It can be seen that the assembled load of the spring 110 must be overcome to shift spool 52 to the left relative to the body 38, and that of spring 98 must be overcome to shift the spool to the right. Springs 98 and 100 thus form a resilient coupling between relatively movable members which may be termed input and output members. The input member comprises valve spool 52 and those parts positively translatable therewith, including abutments 102 and 104, C washer 90, and the sleeve 84. The output member comprises body 38 and those parts positively translatable therewith, including end cap 40, sleeve 106, abutments 108 and 110, and sleeve 42.

Stepped valve bore 50 includes an enlarged portion 120 having a reaction piston 122 in axial sliding fluid sealing engagement therewith. Reaction piston 122 encircles a reduced portion 124 of valve spool 52 in slidable fluid sealing engagement therewith and has a spherical portion 126 cooperating with a spherical seat in a washer 128. Washer 128 normally abuts against the shoulder 130 formed by snap ring 107. The spherical contact between washer 128 and piston 122 is to prevent any possible lack of perpendicularity between the shoulder 130 and the axis of bore 50 from causing binding of piston 122. For practical purposes, however, washer 128 may be regarded as a part of piston 122. C washer 103 on the valve spool 52 is encircled by the central aperture in snap ring 107, thus permitting the shoulder 131 also to abut washer 128. There is thus provided a reaction pressure chamber 132 which is connected to the pressure port 64 by a passage 134. It is apparent that the pressure in port 64, and consequently that in chamber 132, varies directly with the amount of hydraulically produced steering force being applied to the dirigible wheel 28.

Pressure in chamber 132 tends to position spool 52 relative to shoulder 130 and hence sleeve 106. That is, pressure in chamber 132 acts on the annular area 138 of piston 122 to bias the piston and washer 128 into engagement with shoulder 130 while at the same time acting on annular area 136 on spool 52 to bias the shoulder 131 on the spool against washer 128.

Since the pressure in chamber 132 varies directly with the hydraulically produced steering force, pressure in chamber 132 acts to create a force proportional to the hydraulically produced steering force to aid springs 98 and 100 in resisting movement of spool 52 thereby providing control with "feel." For example, if spool 52 is shifted to the left, spring 100 must be overcome, and pressure existing in chamber 132, which is proportional to the hydraulically produced steering force, will act on the annular pressure effective area 136 producing a force on the spool 52 aiding spring 100. If spool 52 is shifted to the right, spring 98 must be overcome and pressure in chamber 132 will act on the large annular area 138 of the piston 122, as well as the area 136, producing a net force on spool 52 aiding spring 98.

The areas 138 and 136 may be in a ratio of 2:1, in which case any given pressure in chamber 132 will exert equal centering force on spool 52 in either direction. However, to provide proper "feel" in both directions, the ratio of the difference between areas 138 and 136 to area 136 should equal the ratio of the effective area of motor 24 exposed to pressure in port 23 to the effective area of motor 24 exposed to presssure in port 25. Thus any given pressure in chamber 132 will exert a centering force on spool 52 dependent on the steering force that pressure is producing at the motor 24.

As heretofore discussed, shoulder 130 determines the position to which hydraulic pressure in chamber 132 urges spool 52, and abutment 110 determines the position to which the springs 98 and 100 urge the spool. Since shoulder 130 and abutment 110 are conjointly shiftable with sleeve 106, a single adjustment of sleeve 106 results in adjustment of both the hydraulic and the spring centered positions of spool 52. In order to insure that the spring and hydraulic centered positions of spool 52 are the same, the spacing between abutment 104 and shoulder 131 must be the same as that between abutment 110 and shoulder 130. For this purpose, spacing between abutment 104 and 131 can be established by nut 105.

In operation, the vehicle operator may apply a steering movement to the pitman arm 32 and ball stud 80 through a conventional steering wheel and gear. The resistance encountered by the dirigible wheels 28 determines the action of valve 16. If that resistance is slight valve 16 may act as merely a mechanical link in the steering mechanism. For example, if wheel 28 turns easily the resilient coupling between the input and output members provided by springs 98 and 100 may transmit the entire driving force and permit no relative motion between those two members. If, however, wheel 28 encounters any considerable resistance to movement, either spring 98 or 100 will be overcome and the input member will move relative to the output member, thus causing pressure increase in one of the motor ports 66 or 68, as heretofore described, to produce a hydraulic steering force at motor 24. This pressure increase is utilized in chamber 132 to produce a reaction force tending to recenter the valve thus providing "feel" as previously described.

In case of a power failure in the hydraulic system, safety of the vehicle and its passengers is insured by the provision for direct mechanical steering resulting from the abutment of sleeve 84 against the shoulder 86 or 88 which limits relative movement between the input and output members.

The relative movement required between the valve spool 52 and the body 40 to produce a hydraulic steering force is very slight. It consequently becomes important that the valve spool 52 be biased to a center position relative to the motor ports 66 and 68, which is quite critically located. If, after assembly and installation, the valve 16 is not properly centered, a rapid accurate one operation adjustment is possible by merely shifting the adjustable sleeve 106 in the end cap 40.

It will thus be seen that the present invention has provided a low cost, spring centered control valve providing follow-up action and having hydraulic centering means to provide "feel," the spring and hydraulic centered positions being conjointly adjustable by a single simple adjustment.

While the form of embodiment of the invention as herein disclosed constitutes a preferred form, it is to be understood that other forms might be adopted, all coming within the scope of the claims which follow.

What is claimed is as follows:

1. In a control valve having a relatively movable body and spool, a device for resiliently centering said body and spool comprising: a first pair of adjustably spaced apart abutments on said spool; an axially floatable collar between said abutments; a second pair of spaced apart abutments conjointly axially adjustable relative to said body; first resilient means exerted between one of said second pair of abutments and said collar to bias said collar against the other of said second pair of abutments; and second resilient means exerted between said collar and one of said first pair of abutments to bias the other of said first abutments against said collar.

2. In a control valve having a relatively movable body and spool, a device for resiliently centering said body and spool comprising: a first pair of adjustably spaced apart abutments on said spool; an axially floatable collar between said abutments; a second pair of spaced apart abutments conjointly axially adjustable relative to said body; first resilient means exerted between one of said second pair of abutments and said collar to bias said collar against the other of said second pair of abutments; and second resilient means, nested inside said first resilient means, exerted between said collar and one of said first pair of abutments to bias the other of said first abutments against said collar.

3. In a control valve having a relatively movable body and spool, a device for resiliently centering said body and spool comprising: a first pair of spaced apart abutments on said spool; an axially floatable collar between said abutments; a second pair of spaced apart abutments conjointly axially adjustable relative to said body; first resilient means exerted between one of said second pair of abutments and said collar to bias said collar against the other of said second pair of abutments; and second resilient means exerted between said collar and one of said first pair of abutments to bias the other of said first abutments against said collar; a first shoulder on the spool; a pressure effective area on the spool; an axially floatable piston slidable into engagement with said shoulder, encircling said spool between said shoulder and said pressure effective area; a pressure chamber between said piston and said pressure effective area; a second shoulder, shiftable conjointly with said second pair of abutments, against which said piston is biased by pressure in said chamber; and means for supplying pressure fluid to said pressure chamber.

4. In a control valve having a relatively movable body and spool, a device for resiliently centering said body and spool comprising: a first pair of spaced apart abutments on said spool; an axially floatable collar between said abutments; a second pair of spaced apart abutments conjointly axially adjustable relative to said body; first resilient means exerted between one of said second pair of abutments and said collar to bias said collar against the other of said second pair of abutments; and second resilient means exerted between said collar and one of said first pair of abutments to bias the other of said first abutments against said collar; a first shoulder on the spool; a pressure effective area on the spool; an axially floatable piston, slidable into engagement with said shoulder, encircling said spool between said shoulder and said pressure effective area; a pressure chamber between said piston and said pressure effective area; a second shoulder shiftable conjointly with said second pair of abutments against which said piston is biased by pressure in said chamber, said second shoulder lying in the same radial plane as said first shoulder, at the resiliently centered position of said valve; and means for supplying pressure fluid to said pressure chamber.

5. In a control valve having a relatively movable body and spool, a device for resiliently centering said body and spool comprising: a first pair of spaced apart abutments on said spool; an axially floatable collar between said abutments; a second pair of spaced apart abutments conjointly axially adjustable relative to said body; first resilient means exerted between one of said second pair of abutments and said collar to bias said collar against the other of said second pair of abutments and second resilient means exerted between said collar and one of said first pair of abutments to bias the other of said first abutments against said collar; a first shoulder on the spool; a pressure effective area on the spool; an axially floatable piston slidable into engagement with said shoulder, encircling said spool between said shoulder and said pressure effective area; a pressure chamber between said piston and said pressure effective area; a second shoulder, shiftable conjointly with said second pair of abutments, against which said piston is biased by pressure in said chamber; means for supplying pressure fluid to said pressure chamber; and means for shifting said other of said first abutments axially relative to said spool.

References Cited in the file of this patent

UNITED STATES PATENTS

| Number | Name | Date |
| --- | --- | --- |
| 2,361,130 | Simpson | Oct. 24, 1944 |
| 2,383,278 | Stevens | Aug. 21, 1945 |
| 2,596,242 | Hill | May 13, 1952 |